(12) United States Patent
Schoefthaler et al.

(10) Patent No.: US 6,520,017 B1
(45) Date of Patent: Feb. 18, 2003

(54) MICROMECHANICAL SPIN ANGULAR ACCELERATION SENSOR

(75) Inventors: Martin Schoefthaler, Reutlingen (DE); Harald Emmerich, Mutlangen (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 09/638,193

(22) Filed: Aug. 11, 2000

(30) Foreign Application Priority Data

Aug. 12, 1999 (DE) .......................................... 199 38 206

(51) Int. Cl.$^7$ ............................................ G01P 15/125
(52) U.S. Cl. .................................. 73/514.02; 73/514.32
(58) Field of Search .......................... 73/514.02, 514.04, 73/514.15, 514.16, 514.17, 514.32, 514.38, 514.01

(56) References Cited

U.S. PATENT DOCUMENTS

| | | | | |
|---|---|---|---|---|
| 5,251,484 A | * | 10/1993 | Mastache | 73/514.02 |
| 5,528,937 A | * | 6/1996 | Duforu | 73/514.32 |
| 5,635,640 A | * | 6/1997 | Geen | 73/504.12 |
| 5,818,227 A | * | 10/1998 | Payne et al. | 324/259 |
| 6,257,062 B1 | * | 7/2001 | Rich | 73/514.32 |

FOREIGN PATENT DOCUMENTS

DE 196 323 63 1/1998

OTHER PUBLICATIONS

Lutz et al., *A Precision Yaw Rate Sensor in Silicon micromachining*, SAE Technical, 980267.
Funk et al., *Surface–micromachining of Resonant Silicon Structures*, The 8$^{th}$ International Conference, Stockholm, Sweden, Jun. 25–29, 1995, pp. 50–52.
Mizuno et al., "A Silicon Bulk Micromachined Crash Detection Sensor With Simultaneous Angular And Linear Sensitivity," Proc Transducers '99, Japan, Jun. 7–10, 1999, pp. 1302–1305.
Offenberg et al., *Novel Process for a Monolithic Integrated Accelerometer*, Transducers 95.
Park et al., *Capacitive Sensing Type Surface Micromachined Silicon Accelerometer With a Stiffness Tunig Capability*, Proc. MEMS 98, pp. 637–642 (1998).

* cited by examiner

Primary Examiner—Helen Kwok
(74) Attorney, Agent, or Firm—Kenyon & Kenyon

(57) ABSTRACT

A micromechanical angular-acceleration sensor having a substrate, which has an anchoring device provided on the substrate. The sensor has a ring-shaped inertial mass joined to the anchoring device by a torsion-spring device such that the anchoring device is essentially located in the center of the ring. The ring-shaped inertial mass can then be elastically displaced from its resting position, about at least one rotational axis, by the angular acceleration to be detected. The sensor has a displaceable, first capacitor-plate device attached to the ring-shaped inertial mass, and a stationary, second capacitor-plate device attached to the substrate. The first and the second capacitor-plate devices are designed as a differential-capacitor device for detecting one of the parameters indicating the angular acceleration about the rotational axis.

9 Claims, 4 Drawing Sheets

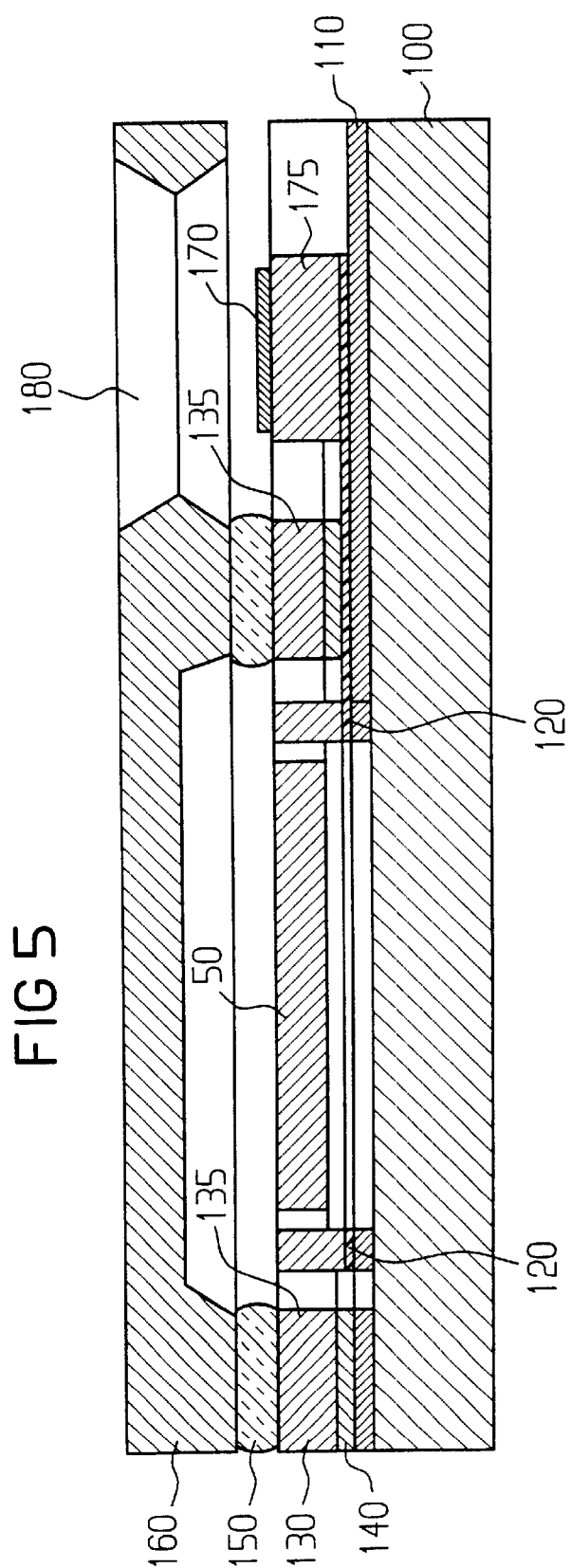

MICROMECHANICAL SPIN ANGULAR ACCELERATION SENSOR

FIELD OF THE INVENTION

The present invention relates to a micromechanical angular-acceleration sensor.

BACKGROUND INFORMATION

Rpm sensors (gyroscopes, rotational speed sensors) are usually used to determine angular acceleration. In this case, the angular acceleration is derived from the yaw rate (rate of rotation) by differentiating it with respect to time.

Rpm sensors usually requiring relatively complicated evaluating electronics are discussed in M. Lutz, W. Golderer, J. Gerstenmeier, J. Marek, B. Maihöfer, and D. Schubert, A Precision Yaw Rate Sensor in Silicon Micromachining, SAE Technical Paper, 980267; and from K. Funk, A. Schilp, M. Offenberg, B. Elsner, F. Larmer, Surface-micromachining of Resonant Silicon Structures, The $8^{th}$ International Conference on Solid-State Sensors and Actuators, Eurosensors IX, Stockholm, Sweden, Jun. 25–29, 1995, pages 50–52.

In addition, an angular-acceleration detection system is disclosed in German Patent No. 196 323 63, where several acceleration sensors are evaluated electronically, and the angular acceleration is derived by combining, i.e. forming the differential, cumulative, and average values of, the acceleration-sensor signals.

Furthermore, Mizuno J., Nottmeyer K., Kanai Y., Berberig O., Kobayashi T., Esashi M., Proc. Transducers '99, Sendai, Japan, June 7–10, 1999, pages 1302–1305, describes a complicated, combined linear/angular-acceleration sensor.

Therefore, the present invention is based on the general problem of providing a micromechanical angular-acceleration sensor, which requires relatively simple evaluating electronics.

SUMMARY OF THE INVENTION

The present invention is based on the idea of being able to determine the angular acceleration without the time derivative of the rotational speed, by using certain sensor patterns. For this purpose, a simple, capacitive, differential-capacitance measuring set-up can be used.

The micromechanical angular-acceleration sensor, which is in accordance with the present invention, has the particular advantage of being small in size and, for example, being able to be manufactured inexpensively, using a standard, surface-micromechanics manufacturing method.

The series production method is a method that is also known from the manufacture of acceleration sensors having comb patterns. The use of surface micromechanics, especially the serial production method having a thick epipoly layer that is typically 10 µm thick, permits the production of a stiff sensor structure, which allows a small lateral sensitivity to be attained.

A further refinement provides a deflectable, third capacitor-plate device attached to the ring-shaped centrifugal mass, and a stationary, fourth capacitor plate device attached to the substrate. The third and fourth capacitor-plate devices are designed as a stiffness-tuning device for electrostatically tuning the spring constant of the torsion spring. This allows the measuring sensitivity to be adjusted beyond the technical limits of the method.

According to an additional refinement, the centrifugal mass has an annular structure and can be deflected about the rotational axis normal to the surface of the substrate.

In another refinement, the first capacitor plate device and the third capacitor plate device are formed in recesses of the annular structure. This saves valuable layout space.

A further refinement has the second capacitor plate device and fourth capacitor plate device extending into the recesses of the annular structure. This provides a compromise between a mass which is far away from the point of rotation (maximum moment of inertia) and electrodes which are also located far out for converting the angular change caused by an external angular acceleration into a change in distance that is as large as possible.

According to another refinement, the centrifugal mass has a double-ring structure, and can be displaced about a rotational axis normal to the substrate surface. In this case, the differential-capacitor device and/or the stiffness-tuning device are expediently arranged between the two circular rings.

According to a further refinement, the torsion spring device is led through breaks in the inner circular ring to the outer circular ring. This reduces the flexural stiffness, and therefore increases the sensitivity.

According to another refinement, the centrifugal mass has a rectangular-ring structure and can be displaced about a rotational axis running in a direction parallel to the substrate surface. This also yields a rotationally symmetric centrifugal-mass structure for this rotational axis.

An additional refinement provides for the first capacitor-plate device being on the sides of the rectangle that run in a direction parallel to the rotational axis, and for the second capacitor-plate device being in substrate regions subjacent thereto. This allows a differential capacitor to be produced according to the rocker principle.

BRIEF DESCRIPTION OF THE DRAWINGS

FIG. 5 shows a cross-sectional view of a possible encapsulation for the first through third specific embodiments of the micromechanical angular-acceleration sensor according to the present invention shown in FIGS. 1 through 3.

DETAILED DESCRIPTION

Figure 1:
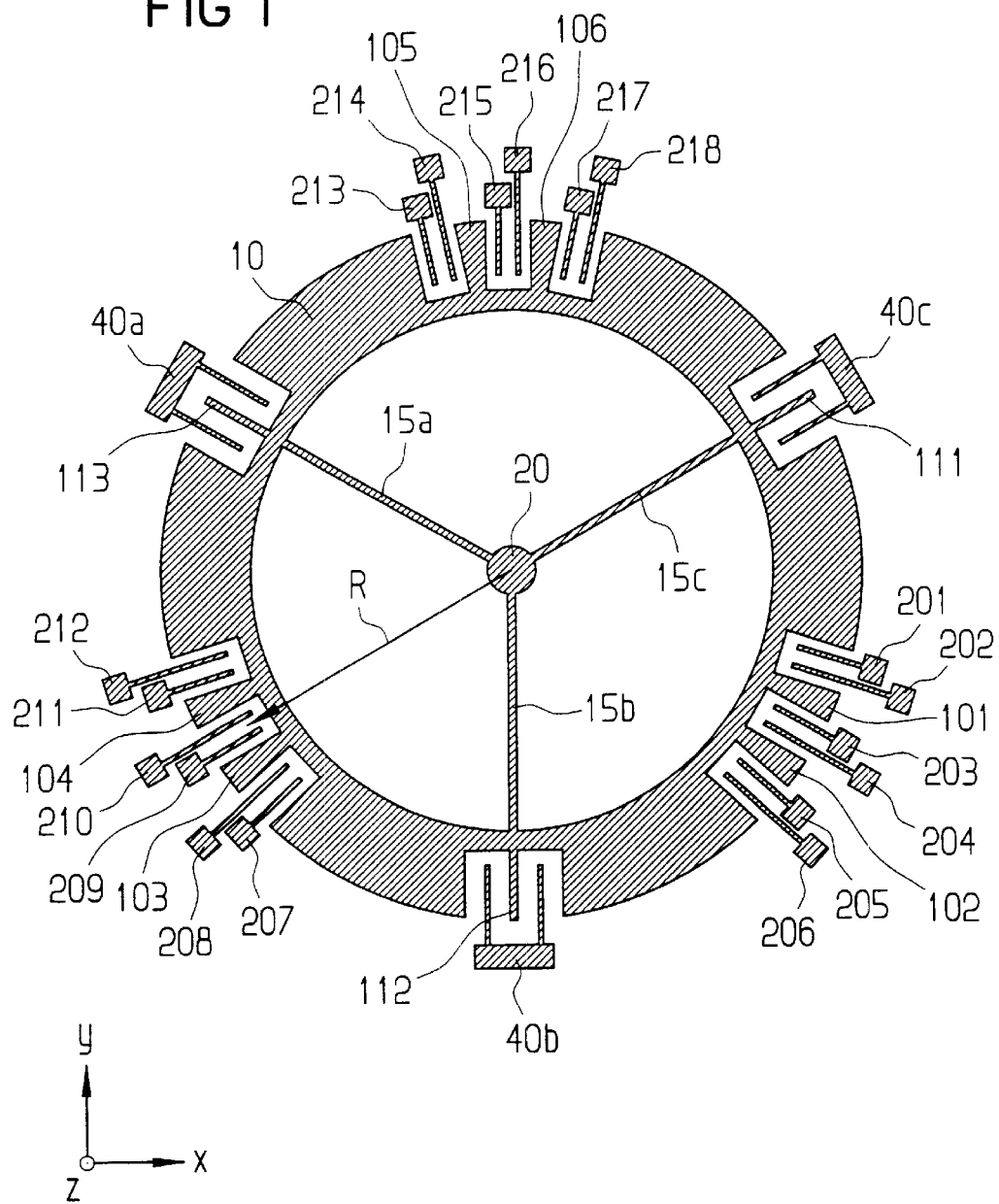
FIG. 1 shows a schematic plan view of a first specific embodiment of the micromechanical angular-acceleration sensor according to the present invention.

In the figures, the same reference numerals denote identical or functionally identical components.

FIG. 1 shows a schematic plan view of a first specific embodiment of the micromechanical angular-acceleration sensor according to the present invention.

A substrate, e.g. a Si wafer, which is not shown and has an anchoring device 20, e.g. a post, included on it, is provided in this first specific embodiment of the micromechanical angular-acceleration sensor.

A ring-shaped centrifugal mass 10 is joined to anchoring device 20 by a torsion-spring device made up of three torsion springs 15a, 15b, and 15c, in such a manner, that anchoring device 20 is essentially in the center of the ring, so that ring-shaped centrifugal mass 10 can be elastically displaced about the z axis, from its resting position, by the angular acceleration to be detected. It is advisable to have at least three torsion springs, in order to retain a low sensitivity to accelerations in the x and y directions.

A displaceable, first capacitor-plate device, which includes six capacitor plates 101–106, is attached to ring-shaped centrifugal mass 10. The adjoining ring material also acts as a part of a capacitor. A stationary, second capacitor-plate device, which includes eighteen capacitor plates 201–218, is attached to the substrate.

The first and the second capacitor plate devices are designed as a differential-capacitor device for detecting one of the parameters, displacement a in this case, that indicates the angular acceleration about the rotational axis; a being approximately equal to radial distance R times angle of rotation $\psi$.

Since, in simple terms, two capacitances change here in opposite directions upon applying the measuring signal, an evaluation procedure used in acceleration sensors, namely the differential-capacitor principle, can be used for evaluating displacement a. Only the magnitude of the resting capacitances (sensor design) and the amplification (gain) of the evaluating electronics is adapted to the integrated evaluation circuit ("evaluation IC") and the measuring range, respectively.

A displaceable, third capacitor-plate device, which is attached to ring-shaped centrifugal mass 10 and has three capacitor plates 111–113, and a stationary, fourth capacitor-plate device, which is attached to the substrate and includes three pairs of capacitor plates 40a–c, are used as a stiffness-tuning device for electrostatically tuning the spring constant of torsion-spring device 15a, 15b, 15c. This is explained below in more detail.

In order to save space, first capacitor-plate device 101–106 and third capacitor-plate device 111–113 are formed in recesses of the annular structure, second capacitor-plate device 201–218 and fourth capacitor-plate device 40a–c extending into the recesses of the annular structure and electrostatically interacting with corresponding, displaceable capacitor plates.

The function of the angular-acceleration sensors described here is based on the following physical relation. In response to the occurrence of an angular acceleration, i.e. first time derivative of the rotational speed, a torque M is applied to one of the bodies coupled to the forced movement, namely centrifugal mass 10, 10', 10" in this case. In the case of rotation about the corresponding rotational axis, this torque M=J·d$\omega$/dt is a linear function of angular acceleration $d^2\alpha/dt^2$=d$\omega$/dt and mass moment of inertia J=$\int r^2$ dm of the coupled body. The infinitesimal magnitude dm represents the mass element located at the tip of radius r with respect to the rotational axis. This torque M about the rotational axis acts in such a manner on a mass m suspended by the torsion springs, that the torsion springs are displaced about the rotational axis by an angle $\psi$, and finally, torque M caused by the angular acceleration and restoring torque $M_R$=D·$\psi$ applied by the torsion springs, equilibrate. In this case, D indicates the directional moment, which is an effective spring constant based on the rotational axis. The following applies for the state of equilibrium:

$M=M_R$ or $\psi=J/D d^2\alpha/dt^2$

Figure 2:
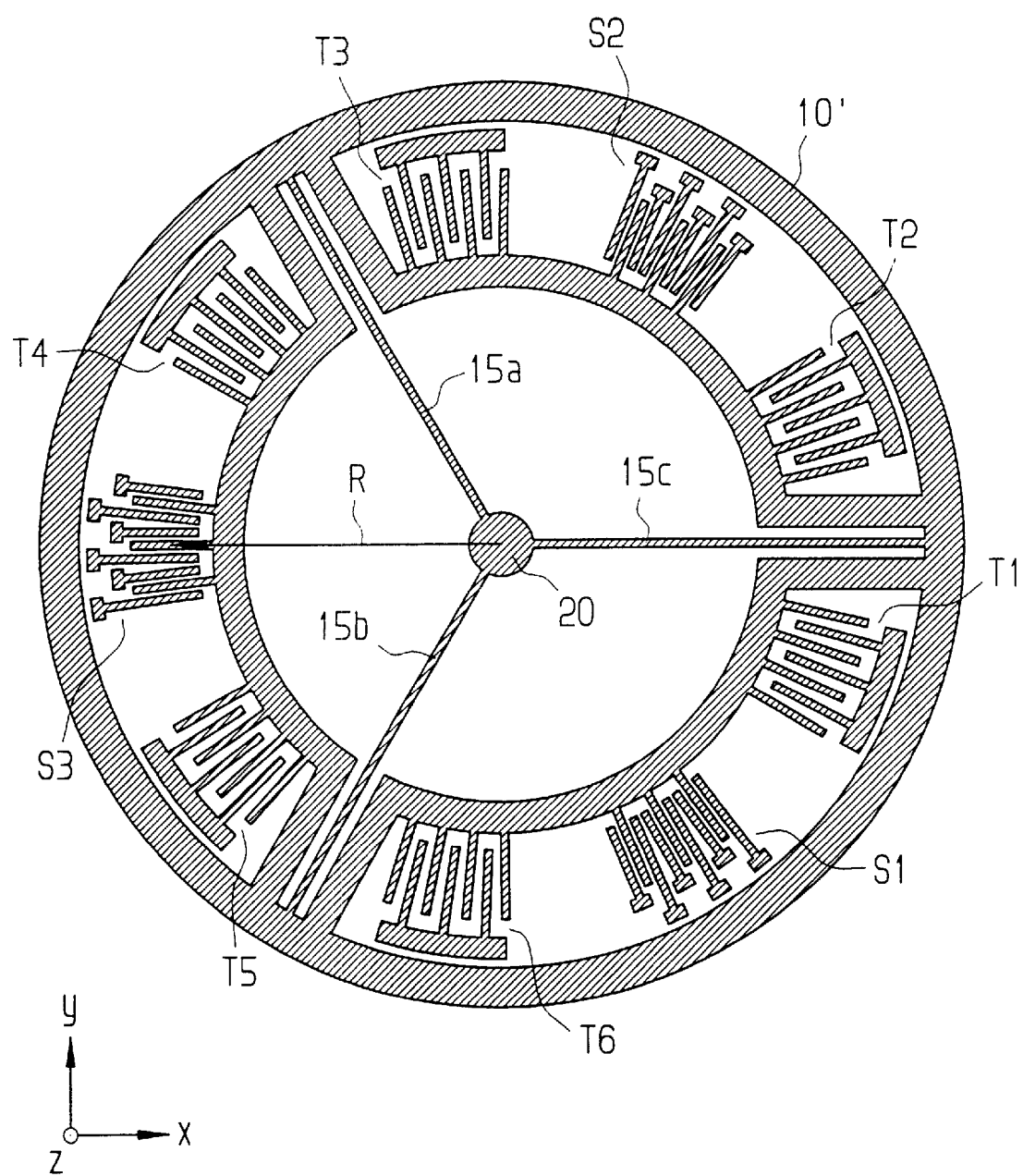
FIG. 2 shows a schematic plan view of a second specific embodiment of the micromechanical angular-acceleration sensor according to the present invention.

FIG. 2 illustrates a schematic plan view of a second specific embodiment of the micromechanical angular-acceleration sensor according to the present invention.

In the case of the micromechanical angular-acceleration sensor according to this second specific embodiment, centrifugal mass 10' has a double-ring structure, and can be displaced about the z axis as well. For reasons of clarity, the differential-capacitor device is denoted by the combined reference numerals S1–S3, and the stiffness-tuning device by the combined reference numerals T1–T6.

Both capacitor devices are disposed between the two circular rings of the double-ring structure. In this case, the displaceable capacitor plates are located on the outer periphery of the inner circular ring (in principle, they can also be located on the inner periphery of the outer circular ring). Torsion springs 15a, 15b, and 15c are led through breaks in the inner circular ring to the outer circular ring, and act there.

It can be seen from FIG. 2, that it is useful to use long torsion springs, and at the same time, only provide thin rings as a centrifugal mass 10', which form the mass moment of inertia in the outer region. The reason for this is that the measuring effect in the micromechanics is rather small. Displacement a, which finally effects measurable changes in capacitance, is given by $\alpha$=J/DR$\alpha$.

Since the intention is to measure angular acceleration, the mass moment of inertia can be maximized, the directional moment can be minimized, and the displacement radius, i.e. the position of the capacitor plates relative to the spring suspension, can also be maximized, in order to attain as large a measuring effect as possible.

The mass moment of inertia J is determined by the mass (linearly) and the position of this mass relative to the point of suspension (quadratically).

The directional moment is a function of the number of springs (linear), the spring height (linear), the spring width (cubic), and the spring length (inverse cubic). This can be shown as follows.

The spring constant $k_r$ of a torsion spring, which in the form of an individual beam, is determined in the lateral direction by:

$$k_R = E \frac{h \cdot b^3}{l^3}$$

l representing the length of a beam, h representing the height, and b representing the width. The specific embodiment having the three torsion springs, which is represented in FIG. 2, yields a tripling of the resulting spring constant. The directional moment can be acquired by considering the following. By twisting the rotor structure, a restoring force $F_r$ acts at the ends of the beam springs having radius $r_{mech}$, the restoring force being a function of the displacement x$\approx r_{mech}\cdot\psi$ at that position:

$F_R = k_R \cdot r_{mech} \cdot \psi$.

The corresponding torque Mr and the directional moment $D_{mech}$ can be accordingly calculated from this by considering the number of bending beams $n_B$:

$M_R = n_B \cdot k_R \cdot r^2_{mech} \cdot \psi$  $D_{mech} = n_B \cdot k_R \cdot r^2_{mech}$ As can be seen from the above equation, one attains a flexible spring through a long and narrow beam design. The height of the beam is not initially available for use as a design parameter, since the method does not allow this to be easily changed.

Decreasing the height of the structure would result in a markedly increased sensitivity of the structure to external z accelerations. For the spring constant in the z direction of an individual beam is:

$$k_z = E \frac{h^3 \cdot b}{l^3}$$

The measuring effect is limited by the minimum, technologically possible structural width (spring width), the maximum size of the sensor configuration (chip area), and the transverse sensitivity of the structure to accelerations in the z direction, i.e. normal to the chip surface.

The design represented in FIG. 2 takes into account these partially opposing requirements: Long, narrow torsion springs and a mass that is as small as possible (i.e. low sensitivity to linear accelerations due to F=m·a), with the mass moment of inertia being maximized at the same time by the mass being a long distance from the anchoring point. In order to maintain a scale for the displacement with as large a radius as possible, the detecting electrodes of differential-capacitor device S1–S3 are likewise mounted as far out as possible.

Figure 3:
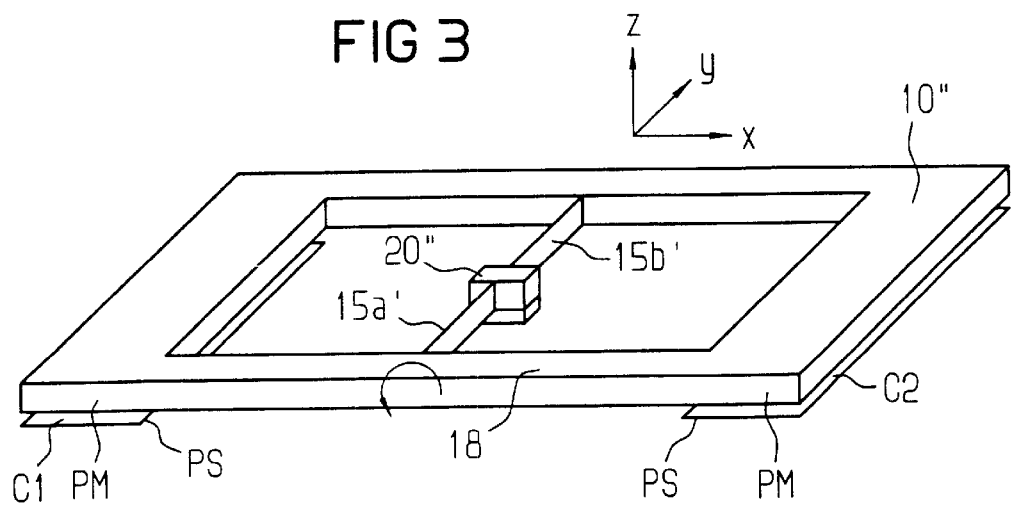
FIG. 3 shows a schematic perspective view of a third specific embodiment of the micromechanical angular-acceleration sensor according to the present invention.

FIG. 3 illustrates a schematic perspective view of a third specific embodiment of the micromechanical angular-acceleration sensor according to the present invention.

As shown in this third specific embodiment, inertial mass 10″ of the micromechanical angular-acceleration sensor has a rectangular-ring structure, and can be displaced about a rotational axis, denoted here as the y axis, running in a direction parallel to the substrate surface. First capacitor-plate device PM is provided on rectangular sides that also run in a direction parallel to the rotational axis, and second capacitor-plate device PS is provided in substrate regions subjacent thereto. Differential capacitors C1 and C2 are thus formed between the movable sensor configuration and the substrate.

In this third specific embodiment, inertial mass 10″ is also intended to be as far as possible from the rotational axis, in order to attain as large a mass moment of inertia as possible, while simultaneously minimizing the mass (transverse sensitivity). In this case, the restoring spring torques are applied by beam-like torsion springs 15a′ and 15b′, which are joined to inertial mass 10″ by mountings 18 that are thin, but as stiff as possible.

The following design considerations for this design are also analogous to those of the first and second specific embodiments. The sensor mass is minimized due to transverse sensitivities, whereas the mass moment of inertia should be maximized. This is achieved by attaching inertial mass 10″ at the end of long cantilevers, relatively to the suspension axis.

Figure 4:
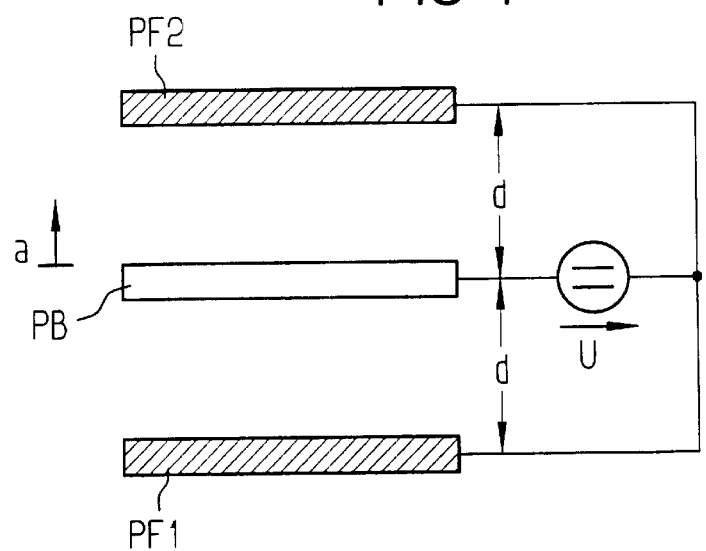
FIG. 4 shows a schematic representation of a movable electrode between two stationary electrodes, in order to illustrate the derivation of the electrical spring constant.

FIG. 4 gives a schematic representation of a movable electrode between two stationary electrodes, in order to illustrate the derivation of the electrical spring constant.

In FIG. 4, PF1 and PF2 indicate stationary capacitor plates, PB indicates a movable capacitor plate, U a voltage, d the plate clearance, and a the displacement.

To measure smaller angular accelerations, or to attain a larger difference in sensitivity between the measured parameter (angular acceleration) and transverse effects (z acceleration), so-called stiffness-tuning devices are provided with the above-described first and second specific embodiments; e.g., such as those described in K. Y. Park, C. W. Lee, H. S. Jang, Y. S. Oh, and B. J. Ha, Capacitive Sensing Type Surface Micromachined Silicon Accelerometer with A Stiffness Tuning Capability, Proc. MEMS98, Jan. 25–29, 1998, Heidelberg, Germany, pages 637–642. These produce an electrical force of attraction, using an electrical DC voltage. The effect of this attractive force can be regarded as a negative spring constant.

Adding the mechanical and the electrical spring constants reduces the spring stiffness, and therefore, decreases the torques for displacing the sensor mass. The entire directional moment can also be expressed as the sum of the mechanical and electrical directional moments.

Therefore, $k=k_{mech}+k_{el}$ and $D=D_{mech}+D_{el}$.

In order to show the physical reasoning behind this, the following draws upon the energy content of a plate capacitor having area A, as illustrated in FIG. 5. The electrical energy can be expressed as:

$$W_{el} = \frac{1}{2} C \cdot U^2 = \frac{1}{2} \cdot \varepsilon_0 \cdot A \cdot U^2 \left( \frac{1}{d-x} + \frac{1}{d+x} \right)$$

The action of the force in the x direction can be determined by differentiating the energy one time with respect to displacement. If it is differentiated once more with respect to x, then one obtains an electrical spring constant.

$$kel = -\frac{\partial^2 W_{el}}{\partial x^2} = -\varepsilon_0 \cdot A \cdot U^2 \left( \frac{1}{(d-x)^3} + \frac{1}{(d+x)^3} \right) = -2 \cdot \varepsilon_0 \cdot A \cdot U^2 \cdot \frac{d^3 + 3 \cdot d \cdot x^2}{(d^2 - x^2)^3}$$

The negative sign of the spring stiffness results from the action of the force opposing the mechanical beam spring. As can be seen in the above equation, the electrical spring constant is a function of the displacement, and is nonlinear. For the sake of approximation, the spring constant can be simplified to:

$$k_{el} = -2 \cdot \varepsilon_0 \cdot A \cdot U^2 \frac{1}{d^3}$$

around the resting position, i.e. x=0.

So the electrical spring constant is a strong function of the applied-voltage fluctuations, gap d, and the variations in the gap that are limited by the process technique. This is why the gap of the stiffness-tuning electrodes in the present design is selected to be large in comparison with the displacements of the sensor structure, while maximizing the measuring range.

In summary, this measure purposefully renders the sensor more flexible about the measuring axis, whereas the lateral sensitivities remain untouched by this.

The nonlinearity of the system introduced by the positive feedback from the stiffness-tuning electrodes can be minimized in relation to the nominal displacements, by appropriately selecting the electrode gaps.

FIG. 5 displays a cross-sectional view of a possible enclosure for the first through third specific embodiments of the micromechanical angular-acceleration sensor according to the present invention, the first through third specific embodiments being shown in FIGS. 1 through 3.

In addition to the reference numerals already introduced into FIG. 5, 50 denotes a micromechanical angular-acceleration sensor as shown in FIGS. 1 through 3; 100 denotes a substrate; 120 a first printed-conductor layer made of aluminum; 135 a base; 140 an insulating layer made of silicon dioxide; 150 solder glass; 160 a cap in the form of a silicon wafer; 170 a second conducting layer, which is made out of aluminum and is for a bonding pad; 175 a bonding-pad base; and 180 a bonding-pad opening.

The method for packaging the micromechanical angular-acceleration sensor of the present invention will be explained in more detail, using FIG. 5 as a reference.

The micromechanical angular-acceleration sensor of the present invention is first fabricated on prepared substrate 100, using known process steps of surface micromechanics.

For example, see M. Offenberg, F. Lärmer, B. Elsner, H. Münzel, and W. Riethmüller, Novel Process for a Monolithic Integrated Accelerometer, Transducers 95, which describes a surface-micromechanics method. The small structural widths, which can be attained in this manner with large layer thicknesses (high aspect ratio), are especially suitable for measuring small angular accelerations.

First insulating layer 110 made of silicon dioxide is, inter alia, deposited, i.e. grown, and patterned.

First conducting layer 120, which is made out of LPCVD polysilicon (to be buried), and is used to form the electrical terminals for angular-acceleration sensor 50 and the capacitor device, is then deposited and patterned on the first insulating layer.

Second insulating layer 140 made of silicon dioxide is subsequently deposited and patterned on the resulting pattern.

Second conducting layer 130 made of epitaxial polysilicon is now deposited and patterned on the resulting pattern, in order to form angular-acceleration sensor 50 having the capacitor devices. In addition, base 135 for cap wafer 160, and bonding-pad base 175, are formed from this second conducting layer 130.

By undercutting the oxide, the displaceable components are made to be freely movable above substrate 100.

The displaceable components are finally encapsulated. A solder-glass bonding technique is exemplarily shown here for the packaging method. This technique allows sensors to be hermetically encapsulated, and at the same time, allows a vacuum to be enclosed (by means of which the mechanical efficiency or damping of the system can be adjusted). However, other techniques, such as anodic bonding, can be used for packaging.

Although the present invention was previously described using preferred exemplary embodiments, it is not limited to these, but rather can be modified in a variety of ways.

The geometry of the inertial mass, as well as those of the torsion-spring and capacitor arrangements, should especially not be restricted to the illustrated examples. However, larger deviations from the symmetrical configuration about the fixing point may be avoided, when there is a danger of linear portions of the external acceleration invalidating the measuring result.

The described type of packaging and manufacturing method should likewise only be understood as an example, and other methods such as, e.g. galvanic methods, can be used for manufacturing the angular-acceleration sensor, as well.

What is claimed is:

1. A micromechanical angular-acceleration sensor comprising:
    a substrate;
    an anchoring device provided on the substrate;
    a torsion spring device;
    a ring-shaped inertial mass joined to the anchoring device by the torsion spring device, wherein the anchoring device is essentially located in a center of the ring-shaped inertial mass, so that the ring-shaped inertial mass can be elastically deflected from a resting position about at least one rotational axis by an angular acceleration to be detected;
    a displaceable, first capacitor-plate device attached to the ring-shaped inertial mass; and
    a stationary, second capacitor-plate device attached to the substrate, wherein the first capacitor-plate device and the second capacitor-plate device are each designed as a respective differential-capacitor device for detecting a parameter indicating the angular acceleration about the at least one rotational axis.

2. A micromechanical angular-acceleration sensor comprising:
    a substrate;
    an anchoring device provided on the substrate;
    a torsion spring device;
    a ring-shaped inertial mass joined to the anchoring device by the torsion spring device, wherein the anchoring device is essentially located in a center of the ring-shaped inertial mass, so that the ring-shaped inertial mass can be elastically deflected from a resting position about at least one rotational axis by an angular acceleration to be detected;
    a displaceable, first capacitor-plate device attached to the ring-shaped inertial mass;
    a stationary, second capacitor-plate device attached to the substrate, wherein the first capacitor-plate device and the second capacitor-plate device are each designed as a respective differential-capacitor device for detecting a parameter indicating the angular acceleration about the at least one rotational axis;
    a displaceable, third capacitor-plate device attached to the ring-shaped inertial mass; and
    a stationary, fourth capacitor-plate device attached to the substrate, wherein
        the third capacitor-plate device and the fourth capacitor-plate device are each designed as a respective stiffness-tuning device for electrostatically tuning a spring constant of the torsion spring device.

3. The micromechanical angular-acceleration sensor of claim 2, wherein the ring-shaped inertial mass includes an annular structure, and can be displaced about one of the at least one rotational axis normal to a surface of the substrate.

4. The micromechanical angular-acceleration sensor of claim 3, wherein the first capacitor-plate device and the third capacitor-plate device are formed in recesses of the annular structure.

5. The micromechanical angular-acceleration sensor of claim 3, wherein the second capacitor-plate device and the fourth capacitor-plate device extend into recesses of the annular structure.

6. The micromechanical angular-acceleration sensor of claim 2, wherein the ring-shaped inertial mass includes a double-ring structure including two circular rings, and can be displaced about one of the at least one rotational axis normal to a surface of the substrate, at least one of a differential-capacitor device and a stiffness-tuning device being disposed between the two circular rings.

7. The micromechanical angular-acceleration sensor of claim 6, wherein the torsion-spring device is led through breaks in an inner circular ring to an outer circular ring of the two circular rings.

8. The micromechanical angular-acceleration sensor of claim 1, wherein the ring-shaped inertial mass includes a rectangular-ring structure, and can be displaced about one of the at least one rotational axis running in a direction parallel to a surface of the substrate.

9. The micromechanical angular-acceleration sensor of claim 8, wherein the first capacitor-plate device is provided on rectangular sides running in a direction parallel to the one of the at least one rotational axis running parallel to the surface of the substrate, and wherein the second capacitor-plate device is provided in substrate regions subjacent thereto.

\* \* \* \* \*